July 24, 1928.
H. T. FRIIS
SIGNAL RECEPTION
Filed May 28, 1923
1,678,183
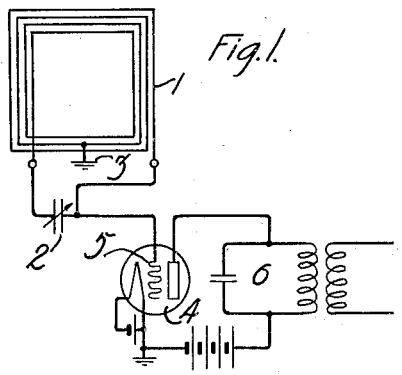
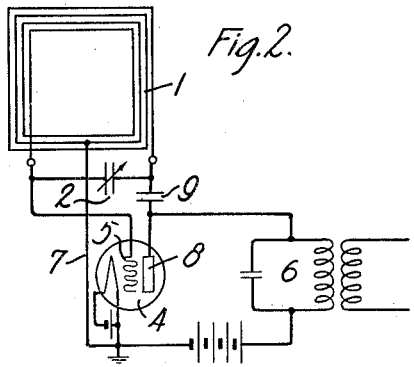
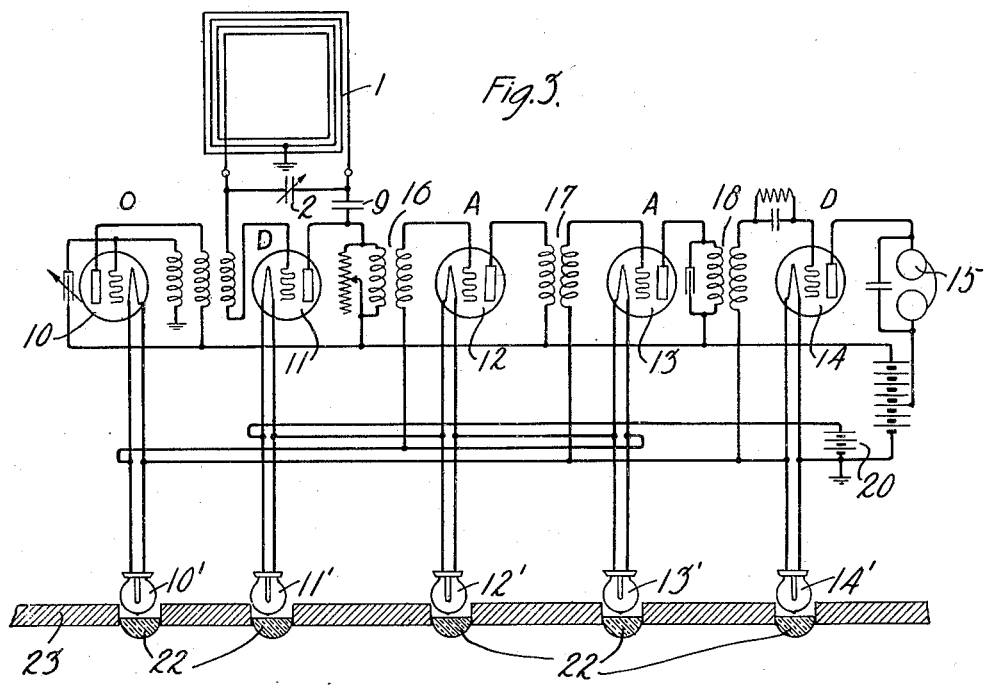
Inventor:
Harald T. Friis
by E. W. Griggs
Atty.

Patented July 24, 1928.

1,678,183

UNITED STATES PATENT OFFICE.

HARALD T. FRIIS, OF CLIFFWOOD, NEW JERSEY, ASSIGNOR TO WESTERN ELECTRIC COMPANY, INCORPORATED, OF NEW YORK, N. Y., A CORPORATION OF NEW YORK.

SIGNAL RECEPTION.

Application filed May 28, 1923. Serial No. 641,810.

The present invention relates to the reception of wave energy for signaling and kindred purposes.

It is an object of the invention to provide a simple and efficient receiving apparatus which will be highly selective of the wave energy desired to be received, which will permit of high amplification of the received signal, and which will be capable of continuous and efficient use in the hands of persons relatively unskilled in the signaling art.

Heretofore, high selectivity with high amplification has been obtained only by the use of relatively complex circuit arrangements of sensitive adjustment which would yield the intended results only by careful manipulation by comparatively skilled persons. The complexity and the difficulty of manipulation has resulted from the manner of using the relatively large number of amplifier tubes that are necessary to obtain the desired degree of amplification, and particularly from the manner of controlling the individual tubes and the manner of associating them with each other and with the receiving or wave collecting conductor. Where many tubes have been used, or where the requisite amplification has been sought by relatively few tubes with high amplification factors, there has been a strong tendency for the circuit to sing, that is to develop self-sustained oscillations which seriously limit the amount of amplification possible. Also, the best operation of the individual tubes depended upon a proper adjustment of their operating voltages, particularly the grid-polarizing voltage. Where batteries are used to polarize the grids, it is a rather difficult matter to test the circuit thoroughly and to determine which tubes have wandered out of adjustment and which have not. A receiving set with the complications heretofore employed would be quite likely to be operated for a large proportion of the time in an inefficient condition by persons unskilled in the signaling art and in case it became inoperative by becoming entirely out of adjustment in some particular, the services of a skilled workman would be required to find and obviate the trouble.

A feature of the present invention comprises a novel manner of associating a receiving set with a wave collecting conductor or other receiving terminal to increase the selectivity and permit of high amplification.

A second feature of the invention comprises a novel manner of indicating continuously when the various tubes employed in the circuit are operative, so that for any desired number of tubes the operative or inoperative condition of any tube or tubes can be recognized instantly and without resorting to any testing operations.

In the specific form of the invention to be more fully described hereinafter, the wave collector is disclosed as a loop type of antenna, preferably rotatable about a vertical axis through the plane of the loop to permit of directional selectivity. The directional selectivity is increased by connecting the center of the loop inductance to earth, this type of connection serving to minimize the undesired open-antenna effect, or the wave-collecting effect due to the capacity of the loop as a whole with respect to earth. The input terminals of the receiving set are connected across a portion only of the loop inductance, this manner of connection serving to increase the frequency selectivity as described more fully hereinafter. The first tube of the set is associated with the loop in a balanced or non-singing relation. The amplification of the received signal is wholly or partly carried out at a frequency lower than the received wave frequency. The proper grid biasing potential for some or all of the tubes is obtained by connecting the tube filaments in series and connecting each grid to an appropriate point of the filament heating circuit. Pilot indicators, preferably in the form of lamps, are connected in shunt of the several tube filaments to indicate the operative and inoperative condition of each tube.

The various features and objects of the invention will be more clearly understood from the following detailed description and from the accompanying drawings, in which: Figs. 1 and 2 show typical forms of input connections, and Fig. 3 shows in schematic form a complete receiving circuit in accordance with the invention.

In Fig. 1 the receiving loop 1 is shown as comprising an inductance made up of one or more turns of wire connected in series with the variable tuning condenser 2. The middle of the inductance, measuring from the condenser terminals, is in accordance with the present invention, connected to ground at 3. The cathode of the receiving tube 4 is also connected to ground, and the grid or control electrode 5 is connected to one terminal of the loop. This manner of connection results in the input circuit of the tube being connected across only one half of the loop inductance and in the center of the loop being connected to earth.

Grounding the midpoint of the loop minimizes the open-antenna effect which in the case of a loop not so grounded is present due to capacity between various portions of the receiving circuit and earth and between the loop and earth. Due to this capacity there would be set up across the receiving terminals of the circuit a potential component independent of the component representing the difference of potential produced solely within the loop itself, and this component due to the capacity-to-earth effect is substantially independent of the angular position of the loop, since the usual vertical or open type of antenna, as is well known, is practically non-directive. For the potentials set up between the terminals of the loop as a result of the wave-intercepting properties of the loop circuit, there is a potential node at the electrical center of the loop and as to potentials thus produced the loop is sharply directional. By earthing this point and connecting the tube filament to it, as indicated in Fig. 1, the grid potential is due at any instant almost entirely to the loop intercepting effect, and the loop is, therefore, made sharply directional.

The actual amplitude of the wave impressed on the receiving circuit by connecting the circuit across one half of the loop inductance is less than if the circuit were connected across the entire loop inductance, but it has been found that the tuning of the loop circuit is sharpened by connecting only across half the loop. The reason for this is probably that the high resistance of the grid circuit when connected across a portion of the inductance introduces less resistance into the oscillatory circuit than if it were connected across the entire inductance. In cases where sharp selectivity is desired, a considerable advantage results from thus connecting the receiving set across only a portion of the inductance of the tuned circuit, and the loss in amplitude from so doing can be made up by employing sufficient amplification.

When a loop type of antenna is used to intercept wave energy it is necessarily exposed to any influences that may be present in addition to the incoming wave to be received. If, as is usual, the loop inductance forms part of a resonant circuit such as is indicated in Fig. 1, there is a tendency for the circuit to be set oscillating independently of incoming energy, particularly where resonance is employed in the output side of the tube 4, as indicated at 6, and where the tube 4 is used to amplify the wave in the loop circuit. Even if the output circuit 6 be magnetically shielded by being inclosed in a metal box so that inductive feed-back is largely eliminated, a capacitative back-coupling exists through the internal capacity of the tube 4, and oscillations in the circuit 6 may, therefore, be impressed on the tuned loop circuit in the proper phase and of sufficient amplitude to cause singing.

According to a further feature of the invention, a balanced type of connection is employed from the wave-intercepting loop to the receiving set as is indicated in Fig. 2. This type of connection has been found to reduce very materially the tendency of the circuit to develop self-sustained oscillations, and permits a much greater amplification to be employed. In this figure, the loop 1 and tuning condenser 2 are as disclosed in the previous figure, and the conductor 7 serves to ground the electrical center of the loop inductance and to connect it to the cathode of the tube 4. The grid 5 is connected to one terminal of the loop and of condenser 2, and the anode 8 is connected to the opposite terminal of the loop through a small balancing condenser 9. The condenser 9 is of such magnitude as to balance the effect of the inherent capacity between the grid 5 and anode 8 in producing oscillations or other undesired phenomena. In case of an otherwise accurately symmetrical circuit, condenser 9 should have substantially the same capacity as the capacity of the anode with respect to the grid.

With the type of connection shown in Fig. 2 any tendency for the capacity between the plate 8 and grid 5 to feed energy back into the grid circuit from the tuned output circuit 6 is opposed by an equal tendency for such energy to be fed back by way of the condenser 9, since the capacity of this condenser matches the internal tube capacity and the potential produced across it is applied to the opposite terminal of the loop. Oscillations of large amplitude may be produced in circuit 6, therefore, without causing the circuit, as a whole, to develop free or uncontrolled oscillations.

The circuit of Fig. 3 embodies the balanced connection of Fig. 2 and also other features of the invention, in an improved type of signal receiving circuit. It will be apparent from the drawing that the loop receiving circuit 1 with the tuning condenser 2 and balancing condenser 9 are connected to the tube 11 of this figure in the same manner as described in connection with the tube 4 of Fig. 2. The tube 11 serves as a detecting or combining tube to produce a beat or intermediate frequency wave by interaction between the received wave and a wave generated by the local oscillator 10. This oscillator, which is indicated as comprising a three-element discharge tube with a tuned grid circuit coupled to the anode branch in well known manner, is adjusted to produce continuous waves of a frequency differing from the frequency of the incoming waves and to apply the waves so produced to the grid circuit of the detector 11. The resulting intermediate-frequency wave, which may advantageously have a frequency that is high compared with signal frequencies, for example of the order of 50000 cycles per second, has impressed upon it the same signal variations as are impressed on the received radio wave. The intermediate frequency wave, however, can be much more readily amplified than the radio frequency wave because at the intermediate frequency the losses due to capacity effects and the like are very much smaller.

Two stages of intermediate frequency amplification are indicated, these being provided by the tubes 12 and 13, but it will be obvious to supply as many additional stages as may be desired. These stages are indicated as being connected with each other by transformer 17, similar transformers 16 and 18 connecting the amplifier portion of the current to the detector 11 and tube 14, respectively. One or more of these transformers may be made resonant at the intermediate frequency either by proper design of the transformer itself or by associating with it a condenser as indicated in connection with transformer 18. The tube 14 is a detector for deriving the signal variations from the amplified wave of intermediate frequency and rendering them audible in receivers 15.

The filaments of all of the tubes employed in the system are shown connected in series with one another and with the source 20 of heating current. The use of grid-polarizing sources is obviated since the grid of any tube needs only to be connected to a point in the filament-heating circuit which possesses the required potential with respect to the filament of that tube to secure the desired polarization. Once properly adjusted, the grid polarization remains in adjustment so long as the filament-heating circuit remains unchanged. So long, therefore, as the various tube filaments remain intact and the source 20 maintains the requisite supply of heating current, no attention need be given the grid adjustments.

In case a tube filament burns out the filament-heating circuit is opened and all of the filaments become cold. In order to obviate the necessity of testing each tube of the circuit to determine which filament or filaments have burned out the invention comprises as another feature, the provision of pilot signals shown in the form of lamps 10' to 14' inclusive, each connected in shunt of a corresponding tube filament. Normally, that is, when the tube filaments are all intact, these pilot lamps are dark, since they are of relatively high resistance and draw very small current. When, however, a tube filament burns out, for example the filament of tube 11, a much larger proportion of the voltage of source 20 than normally is thrown across the lamp 11' and this lamp receives sufficient current to light up, indicating immediately that the filament of the tube 11 is the one at fault. The resistance relations can be made such that if more filaments than one burn out at the same instant, for example, two filaments, the corresponding two lamps will draw sufficient current to give an indication. If a seven or eight tube circuit, however, be arranged so that more than two lamps will light when their filaments burn out, the lamps must be of so low resistance that they will draw comparatively large current at all times, so that the efficiency of the heating circuit is low. But the chance that more than one filament will burn out at once, is very remote.

As examples of the constants of a circuit that has proved advantageous in actual practice, it may be stated that on the assumption that a total of seven tubes have their filaments connected in series and the resistance of each filament is 5 ohms, and the current 0.25 ampere, the lamps may advantageously each have a resistance of 50 ohms, in which case they will normally consume 10% of the current. The total voltage across the seven tubes is seen to be 9 volts, and the normal voltage across each filament and lamp is about 1.25 volts. In case a filament burns out, the current through the corresponding pilot lamp is increased from the normal value of about 0.025 ampere to the order of 1/10 ampere. These values are given by way of example only and are not to be construed as limiting the invention in any wise.

The lamps 10' to 14' inclusive may be mounted in a conspicuous position so as to be easily within view of the operator. As shown they are placed immediately back of pearls or translucent discs 22, etc., mounted in the instrument panel 23.

The operation of the circuit of Fig. 3 will be clear from the description already given. With the filament and anode supply sources connected in circuit it is only necessary to rotate the loop 1 to the proper angular position, to tune the loop by adjusting the condenser 2 and to adjust the frequency of the oscillator 10 by means of its tuning condenser. The waves from the particular station will then be received with sharp selectivity and high amplification.

With normal usage, practically the only parts that will need inspection are the two batteries and the tubes. The state of the batteries can be determined by suitable meters or indicators, and the operative or inoperative condition of each individual tube is constantly indicated by the pilot lamps. It is, of course, a simple matter to replace a tube.

The invention is not to be construed as limited to the precise arrangement shown but its scope is defined in the claims.

What is claimed is:

1. In a receiving apparatus a rotatable wave-intercepting inductance coil, a tuning condenser connected across the terminals of said coil, a connection to earth from the electrical center point of said coil, an electric discharge tube having a cathode, an anode and a grid or impedance controlling element, said cathode being connected to earth and said grid being connected to a terminal of said coil.

2. In a radio receiving system, a loop antenna having a plurality of terminals, a space discharge tube comprising a cathode, an anode, and control electrode, parallel paths between said anode and separate terminals of said antenna, one of said paths including the reactance of said anode and control electrode, and the other path including an equivalent reactance.

3. In a wave receiving and amplifying system, a loop antenna having end terminals, and a mid-terminal, a space discharge tube comprising a cathode, anode and control electrode, individual paths between said mid-terminal and said cathode, and between said end terminals and said anode and control electrode respectively, said last mentioned paths having equal capacities.

4. In a receiving system, a wave-intercepting loop inductance, an electric discharge tube having a cathode, a grid or impedance-controlling element, and an anode, a connection from a point in said inductance to said cathode, a connection from a terminal of said loop to said grid, an outgoing circuit from said anode, and a connection from said anode to the opposite terminal of said loop, said last connection including a condenser having a capacity of the order of the capacity between said anode and grid.

5. In a receiving system, a wave intercepting loop inductance, a tuning condenser therefor, an electric discharge tube having a cathode, an anode, and a grid or impedance-controlling electrode, a connection from said cathode to a point in said inductance, a connection from said grid to a terminal of said inductance and a connection from said anode to the opposite terminal of said inductance, said last connection including a condenser having such a capacity as to prevent the system from producing self-sustained oscillations.

6. A wave receiving and amplifying system in accordance with claim 3, characterized in this, that the path between one end terminal of said loop and said anode includes the capacity between said control electrode and anode.

In witness whereof, I hereunto subscribe my name this 16th day of May, A. D., 1923.

HARALD T. FRIIS.